Patented May 2, 1939

2,156,402

UNITED STATES PATENT OFFICE 2,156,402

PROCESSES FOR SEPARATING PHENOL AND HYDROGEN CHLORIDE FROM THE MIXTURE OF VAPORS OBTAINED BY PASSING CHLOROBENZENE VAPOR AND STEAM OVER A CONTACT AT A RAISED TEMPERATURE

Walter Prahl, Ludwigshafen-on-the-Rhine, Germany, assignor to F. Raschig G. m. b. H., Ludwigshafen-on-the-Rhine, Germany, a firm of Germany No Drawing. Application January 21, 1932, Serial No. 587,928. In Germany January 26, 1931

26 Claims. (Cl. 260—627)

It is known that when chlorobenzene vapor is passed together with steam over a suitable catalyst at a raised temperature, a certain percentage of phenol and hydrochloric acid is formed by hydrolysis of the chlorobenzene. In this process there is obtained a commercially useful yield of phenol, calculated on the quantity of chlorobenzene which is converted, only when this quantity represents a relatively small fraction, for example in the neighbourhood of 20 per cent., of the total quantity of chlorobenzene which is passed over the catalyst.

This process therefore presents the problem of isolating the reaction products, that is to say the hydrochloric acid and the phenol, from the large excess of unconverted chlorobenzene vapor and steam. According to the present state of the art this problem is solved by condensing completely the mixture of vapors which has passed over the catalyst and bringing the condensate into contact with a quantity of caustic soda solution sufficient for complete neutralisation of the hydrochloric acid and phenol. In this manner the phenol is obtained practically completely as sodium phenolate in the aqueous layer from which it may be recovered in known manner, for example by acidification and distillation or extraction by means of a solvent; the chlorobenzene, freed from phenol, is again vaporised, mixed with water vapor and the mixture is returned to the chamber containing the catalyst.

Processes are also known in which the steps above described are conducted in succession in a cyclic manner, for example by condensing the mixture of vapors which has passed over the catalyst and introducing the condensate into a boiling solution of caustic soda, the vapors from which are again passed over the catalyst. The boiling caustic soda solution combines with the hydrochloric acid and the phenol, whilst the chlorobenzene contained in the condensate vaporises immediately on introduction into the boiling caustic soda solution and is thus returned to the catalyst. After some time the caustic soda solution becomes converted completely into a solution of sodium phenolate and common salt, from which solution the phenol may be recovered in known manner.

This solution of the problem of isolating the reaction products from the excess of reacting substances is associated with important disadvantages.

(1) In order to recover the small fraction of reaction products contained in the mixture of vapors, the latter must be condensed as a whole; this involves the use of a large quantity of cooling water;

(2) After removal of the reaction products, the main quantity of the condensate must again be vaporised in order that it may be passed over the catalyst; this requires a considerable quantity of heat;

(3) One of the two reaction products, namely the hydrochloric acid, is lost;

(4) For removing the hydrochloric acid there is required an equivalent quantity of alkali or of an alkaline substance, which is likewise lost and (5) For recovering the phenol there must be used a quantity of alkali at least equivalent to the phenol and this alkali is either also lost or can be again rendered available for use only by way of further chemical processes.

By the present invention it is possible to avoid wholly or in part the aforesaid disadvantages if instead of condensing the mixture of vapors which has passed over the catalyst in order to isolate the reaction products, the reaction products are recovered directly from the vapors and the unconverted reacting substances, freed from reaction products, are again passed over the catalyst in the form of vapor and without an intermediate condensation. In this manner the first and second of the above described disadvantages of previous processes are avoided directly. But it is possible by suitably conducting the process also to avoid the other disadvantages.

The process of the invention differs from the hitherto known cyclic process in that the substances not only circulate over the catalyst and through the apparatus for recovery of the reaction products, but they also retain their form, that is to say they remain in the state of vapor. In its practical application, the process also differs from the hitherto known processes in that the movement of the vapors through the vessel containing the catalyst and apparatus for isolating the reaction products is caused by means of a mechanical device, such as a blower or the like, whereas in the known processes the movement of the vapors is caused without mechanical means by the successive vaporisation and condensation.

In accordance with the invention therefore, the reaction products are isolated by removing them from the mixture of vapors leaving the vessel containing the catalyst.

For this purpose the vapors issuing from the vessel containing the catalyst are treated with a suitable liquid and more particularly an aqueous liquid capable of combining, either physically or chemically, with the hydrochloric acid and phenol to be isolated from the mixture of vapors, the treatment being effected under such conditions that any substantial condensation of the remaining vapors is avoided.

Since both reaction products, hydrochloric acid and phenol, are acidic in character, the washing liquid has advantageously added thereto a substance having an alkaline reaction, such as an alkali.

The procedure is advantageously conducted in any apparatus generally used for washing gases or vapors by means of liquids, principally in washing towers provided with plates or charged with filling bodies.

In this method of operation there may be used as washing liquid for chemically combining with the reaction products a solution or suspension of a substance of alkaline action. For example the vapors leaving the vessel containing the catalyst may be passed through a washing tower which is irrigated with sufficient sodium hydroxide solution for combining with the hydrochloric acid and the phenol, so that there issues from the lower part of the tower a solution of sodium phenolate and common salt; the unconverted chlorobenzene vapor and water vapor leave the top of the tower and may be returned, for example by way of a blower, to said catalyst containing vessel, advantageously after the addition of further quantities of the reacting substances corresponding with those consumed, and if required after passage through a heat exchange apparatus, superheater or the like.

This process avoids only the first two of the disadvantages of the prior processes hereinbefore referred to. There is in fact used no cooling water for condensation and no heat for revaporising the unconverted reacting substances; on the other hand both the hydrochloric acid and a quantity of caustic soda equivalent thereto are lost in the form of common salt of little value, and an equivalent quantity of caustic soda is also consumed in combining with the phenol. It is therefore more advantageous to conduct the recovery of hydrochloric acid and phenol in two stages, that is to say in two washing towers arranged in series. Advantageously the first washing tower is irrigated with such a quantity of water that there is recovered an aqueous hydrochloric acid which is in equilibrium with the hydrochloric acid contained in the mixture of vapors leaving the catalyst containing vessel. In the normal manner of operation there is obtained in this way a hydrochloric acid of 15-20 per cent strength, which is applicable in industry for various purposes. From the mixture of vapors leaving this tower and consisting of chlorobenzene, water and phenol, the phenol may be recovered in various ways in a second washing tower. For example the second washing tower may be irrigated with such a quantity of caustic soda solution that the phenol is converted wholly into sodium phenolate, which is discharged from the lower part of the tower. In this case the first four of the aforesaid disadvantages are avoided, but the consumption of a quantity of caustic soda equivalent to the phenol recovered is not yet eliminated. For avoiding also this disadvantage, use is made of the surprising observation that it is possible to extract phenol practically completely by washing with water from a mixture of the vapors of chlorobenzene, water and phenol. In this case the procedure advantageously consists in conducting the vapor mixture, freed from hydrochloric acid by washing with water in the first tower, into a second washing tower which is likewise irrigated with water. From this tower there is discharged according to the operating method a solution or suspension of phenol in water of about 5-10 per cent strength, from which the phenol can easily be recovered in known manner, for example by extraction with a solvent; a mixture of chlorobenzene vapor and steam leaves the upper part of the tower and may be again passed into the catalyst containing vessel in the manner above indicated. It has proved advantageous to return to the second tower in a cyclic manner the water which has served for washing out the phenol in this tower and has been freed by extraction with a solvent or otherwise from the phenol which it has taken up.

By this procedure all the disadvantages of the prior processes above indicated are overcome. It is not necessary to withdraw heat from or supply heat to the mixture of vapors during its passage through the apparatus in which the reaction products are isolated, and no chemicals are consumed in isolating the products. Consequently both reaction products, the hydrochloric acid as well as the phenol, are obtained in the free state and can be usefully employed without further chemical treatment.

It is possible to remove hydrochloric acid and phenol by washing with water alone because owing to the strongly bent vapor pressure curve of aqueous hydrochloric acid, this acid can be removed completely and with certainty from the gas with the use of a sufficiently high tower and of ordinary water which is always weakly alkaline. Complete removal of the phenol by washing with water is not, however, possible. Since, however, the vapors which return in a cyclic manner to the contact vessel, the small fraction of phenol which remains in the vapor does not represent a loss and considering the process in its entirety, it may be said that the phenol is completely removed by washing. Since for complete removal substantially greater quantities of washing water would be necessary, one will generally be content with the removal of about 90 per cent of the phenol in the washing operation. Should it be necessary for any reason also to remove without residue the remaining 10 per cent of phenol before subjecting the vapors to a further reaction, this residual phenol is advantageously removed by washing with caustic soda solution or the like.

When separate recovery of the hydrochloric acid is not contemplated, the phenol may be isolated by washing the mixture of vapors from the catalyst containing vessel in a washing tower with so much water that not only the hydrochloric acid but also the phenol is washed out of the vapors. In this case the aqueous hydrochloric acid is naturally so diluted that it is hardly applicable for technical use; on the other hand the phenol can easily be recovered completely from the acid water discharged from the tower, for example by extraction.

It will be understood that the water serving for washing the gases may be produced by condensation of a fraction of the mixture of vapors instead of being introduced from an extraneous source. This procedure is mainly advantageous in isolating the reaction products from mixtures of vapors containing a relatively large quantity of chlorobenzene and but little water. Since only a fraction of the total quantity of vapors is condensed and the reaction products can be recovered without the assistance of chemicals this procedure still represents a substantial technical advance in comparison with prior processes in which the total quantity of vapors was condensed and the condensate treated with chemicals for recovery of the reaction products.

The following examples illustrate the invention:

*Example 1.*—In the manufacture of phenol from chlorobenzene by passage of chlorobenzene vapor together with steam at a raised temperature over a catalytic substance there is produced per hour a mixture of vapors having the following composition:

|  | Kilos |
|---|---|
| Chlorobenzene | 1000 |
| Water | 1000 |
| Phenol | 150 |
| Hydrogen chloride | 63 |

The temperature of this mixture is reduced, for example by passage through a preheater, to about 100–150° C.

The mixture of vapors is brought into contact, for example in a washing tower filled with Raschig rings, with a quantity of thinly liquid milk of lime having a temperature of about 100° C. sufficient for combining with the phenol and hydrogen chloride. There is discharged at the lower part of the tower a solution or suspension of calcium chloride and calcium phenolate, under some circumstances containing an excess of calcium hydroxide, containing practically the whole quantity of phenol contained in the vapors in the form of calcium phenolate. From this solution or suspension the phenol can be isolated in known manner. From the upper part of the tower there issue in vapor form 1000 kilos of chlorobenzene and 1000 kilos of water, which are returned to the vessel containing the catalyst, for example by means of a blower, advantageously after the addition of quantities of chlorobenzene and water to replace those consumed by the reaction and advantageously after passage through a heat exchange apparatus.

*Example 2.*—The mixture of vapors referred to in Example 1 is introduced successively into two washing apparatus, preferably formed as washing towers filled with Raschig rings. In the first tower the vapors are treated with a quantity of hot milk of lime sufficient for combining with the hydrochloric acid contained in the vapors, a solution of calcium chloride being discharged at the lower part of the tower. The mixture of vapors leaving the tower then enters a second washing tower, advantageously filled with Raschig rings, where it is treated with a quantity of caustic soda solution sufficient for combining with the phenol contained in the vapors, forming a solution of sodium phenolate which is discharged at the lower part of the tower. From this solution the phenol is isolated, preferably by treating the solution with carbon dioxide in known manner; the solution of sodium carbonate thus produced, after having been freed from phenol, is advantageously regenerated for further use in the process by treatment with burnt lime.

*Example 3.*—The mixture of vapors referred to in Example 1 is first washed in counter-current with about 300 kilos of water per hour at a temperature of about 100° C. in washing vessel, for example in a tower of acid-proof material filled with porcelain Raschig rings. The hydrogen chloride is thereby removed practically completely from the mixture of vapors and is recovered at the lower part of the tower in the form of hydrochloric acid of about 17 per cent strength. It contains about 60 kilos of phenol, partly in solution and partly in suspension, which may be recovered in known manner, for example by allowing the suspension to settle or by extracting it by means of a solvent. The mixture of the vapors leaving the tower is introduced into a second washing vessel, which likewise preferably consists of a tower filled with Raschig rings; in this vessel it is washed, advantageously in counter-current with a quantity of dilute caustic soda solution equivalent to the phenol still contained in the vapor mixture; the temperature of the caustic soda solution is 100° C. The mixture of vapors issuing from this tower consists of about 1000 kilos of water and 1000 kilos of chlorobenzene; it is returned to the contact vessel as indicated in Example 1. The phenol contained in the caustic soda solution can be recovered in known manner, for example by treatment with carbon dioxide.

*Example 4.*—The mixture of vapors referred to in Example 1 is treated in counter-current with about 1700 kilos of water having a temperature of 100° C. in a washing vessel preferably constructed as a washing tower filled with Raschig rings. The liquid discharged at the lower part of the tower contains about 3.5 per cent of hydrochloric acid and 8 per cent of phenol. The phenol can be recovered from the solution in known manner, for example by extraction by means of a solvent. The mixture of vapors leaving the upper part of the tower and consisting per hour of 1000 kilos of chlorobenzene and 1000 kilos of water is circulated again through the catalyst containing vessel as indicated in Example 1.

*Example 5.*—The mixture of vapors described in Example 1 is freed from hydrogen chloride by treatment with 300 kilos of water per hour in a washing vessel such as is described in Example 3, the hydrogen chloride being recovered in the form of hydrochloric acid of about 17 per cent strength. The mixture of vapors is then treated in counter-current in a second washing tower filled with Raschig rings with about 1200 kilos per hour of water having a temperature of 100° C. The phenol is absorbed by the water and is withdrawn at the lower part of the tower in the form of a solution of about 8 per cent strength. The phenol is recovered from this solution and from the hydrochloric acid discharged from the first tower preferably by extraction with a solvent such as benzene or by salting ou'

The water which is used for extracting the phenol from the vapors is advantageously returned by a cyclic process for the treatment of a further quantity of vapors after it has been freed for the greater part from phenol by treatment with a solvent.

The mixture of vapors leaving the second washing tower, namely 1000 kilos of chlorobenzene and 1000 kilos of water per hour is returned by means of a blower to the vessel containing the catalyst, advantageously after replacement of the quantities which have already entered into the reaction and after passage through a heat exchange apparatus.

*Example 6.*—The vapor mixture leaving the vessel containing the catalyst consists per hour of

| | Kilos |
|---|---|
| Chlorobenzene | 1000 |
| Water | 500 |
| Phenol | 150 |
| Hydrogen chloride | 63 |

The mixture of vapors is passed in succession through a washing tower filled with Raschig rings and through a condenser in which 200 kilos of water are condensed from the vapors per hour. The condensate produced in this condenser is introduced in finely subdivided form at the upper part of the washing tower and is conducted counter-current to the vapors ascending through the tower. The descending liquid dissolves the hydrogen chloride and at the same time practically all the phenol precipitates. There is discharged from the tower a mixture of hydrochloric acid of about 17 per cent. strength and phenol from which the latter can be recovered in known manner, for instance by extraction with a solvent. From the upper part of the tower there is discharged through the aforesaid condenser per hour a mixture of 1000 kilos of chlorobenzene vapor and 300 kilos of water vapor. The mixture of vapors leaving the condenser is again introduced into the catalyst containing vessel, advantageously after addition of 200 kilos of water vapor and about 200 kilos of chlorobenzene vapor.

*Example 7.*—When using a solid absorbing agent the procedure may be as follows:

The absorption apparatus preferably consists of four vessels which may be termed I, II, III and IV, respectively, and connected in pairs, viz., I and II, and III and IV, in known manner by means of ducts and valves, so that each pair of vessels can be traversed by the stream of gas in succession in either direction. The vessels contain hurdles through and over which the vapors may pass.

The hurdles in vessel I are charged with 650–700 kilograms of calcium phenolate obtained in a previous operation; the vessel II contains 800 kilograms of dry powdered slaked lime. The vapor mixture referred to in Example 1 is passed for 4 hours through these vessels in the direction of I–II. During this operation the calcium phenolate contained in vessel I absorbs hydrochloric acid and becomes converted into about 350 kilograms of calcium chloride which absorbs water vapor, becomes liquid and may be withdrawn from the bottom of the vessel in the form of a solution which is more or less concentrated depending upon the temperature of the vapors and their composition. In vessel II about 93 per cent of the calcium hydroxide becomes converted into basic calcium phenolate and about 3 per cent into calcium chloride. Whilst this operation is proceeding vessels III and IV are being charged with the same quantities of calcium phenolate and slaked lime respectively. The current of vapors is then changed over and passed for four hours through vessels III and IV. During this operation the calcium chloride solution and any residue of slaked lime is removed from vessel I and the hurdles in this vessel are recharged with 800 kilograms of slaked lime. From vessel II about 1200 kilograms of the 1900 kilograms of calcium phenolate formed therein are removed for further working up; the remaining 650–700 kilograms are then uniformly distributed throughout the vessel. After the lapse of a further 4 hours the current of vapors is again passed through vessels I and II but this time in the direction of II–I. Meanwhile, vessel III is completely emptied of calcium chloride and charged with 800 kilograms of slaked lime whilst about 1200 kilograms of calcium phenolate are removed from vessel IV. During the next period of 4 hours the vapors pass through the vessels III and IV in the direction of IV–III, whilst vessels I and II are prepared for a new operation as above described.

If required the construction may comprise more than two systems of two vessels each, of which one or more systems are in operation, whilst another or others are being emptied and recharged.

*Example 8.*—The procedure when using a gaseous absorption agent may be as follows:

The mixture of vapors referred to in Example 1 is passed from below upwardly through a vertical tower provided with baffle plates. As the vapors enter the tower there are added to them per hour 30 kilograms of gaseous ammonia whereby there are produced 92 kilograms of ammonium chloride which are discharged from the tower in the form of a hot solution of about 40 per cent strength. By cooling or evaporating the solution, the ammonium chloride can be partially or wholly recovered. The phenol is isolated according to one of the methods already described.

What I claim is:

1. A process for separating phenol and hydrogen chloride from the mixture of vapors obtained by passing chlorobenzene vapor and steam over a catalyst at a raised temperature, which comprises removing the reaction products from the mixture of vapors while at least the bulk of the vapor mixture is in the vapor phase, by treating the vapors with a substance in which said reaction products are absorbable.

2. A process for separating phenol and hydrogen chloride from the mixture of vapors obtained by passing chlorobenzene vapor and steam over a catalyst at a raised temperature, which comprises removing the reaction products from the mixture of vapors while at least the bulk of the vapor mixture is in the vapor phase, by treating the vapors with an aqueous liquid.

3. A process for separating phenol and hydrogen chloride from the mixture of vapors obtained by passing chlorobenzene vapor and steam over a catalyst at a raised temperature, which comprises removing the reaction products from the mixture of vapors while at least the bulk of the vapor mixture is in the vapor phase, by treating the vapors with an aqueous liquid containing an added substance having an alkaline reaction.

4. A process for separating phenol and hydrogen chloride from the mixture of vapors obtained by passing chlorobenzene vapor and steam over a catalyst at a raised temperature, which comprises removing the reaction products from the mixture of vapors while avoiding any substantial condensation thereof, by washing the vapors with water obtained by condensing a small fraction of the mixture of vapors, whilst the bulk of the mixture remains uncondensed.

5. A process for separating phenol and hydrogen chloride from the mixture of vapors obtained by passing chlorobenzene vapor and steam over a catalyst at a raised temperature, which comprises removing the reaction products from the mixture of vapors while avoiding any substantial condensation thereof, by washing the vapors with water containing an added substance having an alkaline reaction, the water required for the washing operation being obtained by condensing a small fraction of the mixture of vapors, whilst the bulk of the mixture remains uncondensed.

6. A process for separating phenol and hydrogen chloride from the mixture of vapors obtained by passing chlorobenzene vapor and steam over a catalyst at a raised temperature, which comprises removing the hydrogen chloride and phenol simultaneously from the mixture of vapors by treating the same with a relatively large quantity of water while avoiding condensation of a substantial part of the mixture of vapors.

7. A process for separating phenol and hydrogen chloride from the mixture of vapors obtained by passing chlorobenzene vapor and steam over a catalyst at a raised temperature, which comprises removing the hydrogen chloride and phenol simultaneously from the mixture of vapors by treating the same with a relatively large quantity of water containing an added substance having an alkaline reaction is added, while avoiding condensation of any substantial part of the mixture of vapors.

8. A process for separating phenol and hydrogen chloride from the mixture of vapors obtained by passing chlorobenzene vapor and steam over a catalyst at a raised temperature, which comprises removing the hydrogen chloride and phenol simultaneously from the mixture of vapors by treating the same with a relatively large quantity of water obtained by condensing a small fraction of the mixture of vapors, while avoiding condensation of the bulk of the mixture.

9. A process for separating phenol and hydrogen chloride from the mixture of vapors obtained by passing chlorobenzene vapor and steam over a catalyst at a raised temperature, which comprises removing the hydrogen chloride and phenol simultaneously from the mixture of vapors by treating the same with a relatively large quantity of water to which a substance having an alkaline reaction, the water required for the washing operation being obtained by condensing a small fraction of the mixture of vapors, while avoiding condensation of the bulk of the mixture.

10. A process for separating phenol and hydrogen chloride from the mixture of vapors obtained by passing chlorobenzene vapor and steam over a catalyst at a raised temperature, which comprises removing the reaction products from the mixture of vapors by treating the mixture of vapors first with an amount of a substance capable of absorbing substantially all of the hydrogen chloride and then with an amount of a substance capable of absorbing substantially all of the phenol.

11. A process for separating phenol and hydrogen chloride from the mixture of vapors obtained by passing chlorobenzene vapor and steam over a catalyst at a raised temperature, which comprises first removing hydrogen chloride from the mixture of vapors by treating the same with a relatively small quantity of water and thereafter removing phenol by treating the mixture with a relatively large quantity of water.

12. A process for separating phenol and hydrogen chloride from the mixture of vapors obtained by passing chlorobenzene vapor and steam over a catalyst at a raised temperature, which comprises first removing hydrogen chloride from the mixture of vapors by treating the same with a relatively small quantity of water and thereafter removing phenol by treating the mixture with a relatively large quantity of water, the water required for the washing operation being obtained by condensing a small fraction of the mixture of vapors while avoiding condensation of the bulk of the mixture.

13. A process for separating phenol and hydrogen chloride from the mixture of vapors obtained by passing chlorobenzene vapor and steam over a catalyst at a raised temperature, which comprises first removing hydrogen chloride from the mixture of vapors by treating the same with a relatively small quantity of water and thereafter removing phenol by treating the mixture with an aqueous solution of a substance having an alkaline reaction.

14. A process for separating phenol and hydrogen chloride from the mixture of vapors obtained by passing chlorobenzene vapor and steam over a catalyst at a raised temperature, which comprises first removing hydrogen chloride from the mixture of vapors by treating the same with a relatively small quantity of water and thereafter removing phenol by treating the mixture with an aqueous solution of a substance having an alkaline reaction, the water required for the washing operation being obtained by condensing a small fraction of the mixture of vapors, whilst the bulk of the mixture remains uncondensed.

15. The method of treating a vapor mixture containing chlorbenzol, phenol, steam and hydrogen chloride which consists in absorbing the hydrogen chloride in an inorganic basic composition capable of reacting with the hydrogen chloride to form the corresponding inorganic chloride while avoiding substantial condensation of the steam, phenol and chlorbenzol.

16. The method of treating a vapor mixture containing chlorbenzol, phenol, steam and hydrogen chloride which consists in absorbing the hydrogen chloride in an inorganic basic composition capable of reacting with the hydrogen chloride to form the corresponding metal chloride while avoiding substantial condensation of the steam, phenol and chlorbenzol, and subsequently separating the phenol from the resulting vaporous mixture.

17. The method of treating a vapor mixture containing chlorbenzol, phenol, steam and hydrogen chloride which consists in absorbing the hydrogen chloride in an inorganic basic composition capable of reacting with the hydrogen chloride to form a corresponding metal chloride while avoiding substantial condensation of the steam, phenol and chlorbenzol, and subsequently scrubbing the phenol from the resulting vapor mixture by means of an aqueous medium while avoiding substantial condensation of steam and chlorbenzol vapors.

18. In the manufacture of phenol by the vapor phase hydrolysis of chlorbenzol, the steps which comprise treating a vapor mixture containing chlorbenzol, phenol, steam and hydrogen chloride with an inorganic basic composition capable of reacting with the hydrogen chloride to form the corresponding metal chloride while avoiding substantial condensation of the steam, phenol and chlorbenzol, subsequently scrubbing the phenol from the resulting vapor mixture by means of an aqueous medium while avoiding substantial condensation of steam and chlorbenzol vapors.

19. The method of treating a vapor mixture containing chlorbenzol, phenol, steam and hydrogen chloride which consists in absorbing the hydrogen chloride in a basic composition capable of reacting with the hydrogen chloride to form the corresponding chloride while avoiding substantial condensation of the steam, phenol and chlorbenzol, subsequently separating the phenol from the resulting vaporous mixture and adjusting the composition of the said resulting vaporous mixture to obtain the proper ratio of steam and chlorbenzol prior to returning the said vaporous mixture for repeated catalysis.

20. A process for separating phenol and hydrogen chloride from a mixture of vapors obtained by passing chlorbenzol vapor and steam over a catalyst at a raised temperature, which process comprises first treating the mixture of vapors without substantial condensation thereof with an agent capable of extracting the hydrogen chloride without substantially extracting the phenol, thereafter treating the vapor mixture with an agent capable of extracting the phenol and subsequently adjusting the composition of the resulting vapor mixture to obtain the proper ratio of steam and chlorbenzol in preparation for repeated catalysis.

21. The method of treating a vapor mixture containing chlorbenzol, phenol, steam and hydrogen chloride which consists in absorbing the hydrogen chloride in a basic composition capable of reacting with the hydrogen chloride to form the corresponding chloride while avoiding substantial condensation of the steam, phenol and chlorbenzol, subsequently separating the phenol from the resulting vaporous mixture, and adding chlorbenzol to the resulting vaporous mixture to restore the proper ratio of chlorbenzol and steam in preparation for repeated catalysis.

22. A process for separating phenol and hydrogen chloride from a mixture of vapors obtained by passing chlorbenzol vapor and steam over a catalyst at a raised temperature, which process comprises first treating the mixture of vapors without substantial condensation thereof with an agent capable of extracting the hydrogen chloride without substantially extracting the phenol, thereafter treating the vapor mixture with an agent capable of extracting the phenol and subsequently adjusting the composition of the resulting vapor mixture by adding chlorbenzol to obtain the proper ratio of steam and chlorbenzol in preparation for repeated catalysis.

23. The method of continuous manufacture of phenol by the catalytic vapor-phase hydrolysis of chlorbenzol with steam affording part conversion to HCl and phenol, comprising the following steps effected during progress of the resulting vapor mixture, washing out from the vapor mixture by aqueous medium the conversion products HCl and phenol without substantial condensation of the unconverted ingredients chlorbenzol and steam, fortifying the remaining vapors with fresh supply of chlorbenzol vapor and/or steam as required for replacement of the converted part thereof, and continuously returning such vapors without substantial condensation for repeated subjection to such hydrolysis.

24. The method of claim 23 and wherein both the HCl and phenol are washed out of the vapors in the same single stage for subsequent separation.

25. The method of continuous manufacture of phenol by the catalytic vapor-phase hydrolysis of chlorbenzol with steam affording part conversion to HCl and phenol, comprising the following steps effected during progress of the resulting vapor mixture, washing out from the vapor mixture at one stage by aqueous medium the conversion product HCl without substantial condensation of the phenol or the unconverted ingredients chlorbenzol and steam, washing out from the remaining vapor mixture at a subsequent stage by aqueous medium the phenol without substantial condensation of the chlorbenzol and steam, fortifying the remaining vapors with fresh supply of chlorbenzol vapor and/or steam as required for replacement of the converted part thereof, and continuously returning such vapors without substantial condensation for repeated subjection to such hydrolysis.

26. The method of claim 25 and wherein the HCl is washed out of the vapors with water and without chemical conversion thereby yielding free HCl byproduct.

WALTER PRAHL.